United States Patent
Yanase

[11] Patent Number: 5,852,259
[45] Date of Patent: Dec. 22, 1998

[54] CAPSULE WEIGHT MEASURING APPARATUS

[75] Inventor: Yukichi Yanase, Atsugi, Japan

[73] Assignee: Anritsu Corporation, Tokyo, Japan

[21] Appl. No.: 898,971

[22] Filed: Jul. 23, 1997

[30] Foreign Application Priority Data

Aug. 5, 1996 [JP] Japan ..................................... 8-205966

[51] Int. Cl.$^6$ ............... G01G 19/00; B65B 1/32
[52] U.S. Cl. .............................................. 177/145; 53/502
[58] Field of Search ..................... 177/105, 108, 177/114, 116, 119, 120, 145, 210 C, 50; 198/418.1, 463.4, 468.1; 221/236, 239, 251, 290, 294, 298; 73/863.91, 863.92, 866; 53/53, 54, 502

[56] References Cited

U.S. PATENT DOCUMENTS

| | | | |
|---|---|---|---|
| 3,775,941 | 12/1973 | Bross ........................................ | 53/502 |
| 4,089,152 | 5/1978 | Zanasi . | |
| 4,172,526 | 10/1979 | Moser . | |
| 4,191,294 | 3/1980 | McGrath, Jr. et al. .................... | 53/502 |
| 4,223,751 | 9/1980 | Ayers et al. .......................... | 177/210 C |
| 4,472,960 | 9/1984 | Motoyama et al. ...................... | 73/866 |
| 5,750,938 | 5/1988 | De Caris et al. .......................... | 177/50 |

FOREIGN PATENT DOCUMENTS 52-39961  9/1977  Japan .
64-48713  2/1989  Japan .

*Primary Examiner*—Randy W. Gibson
*Attorney, Agent, or Firm*—Frishauf, Holtz, Goodman, Langer & Chick

[57] ABSTRACT

A supply path which communicates with the bottom of a hopper and drops capsules is formed in a magazine which is periodically moved vertically. When the magazine comes off the lower end position of the vertical motion, a stopper stops the falling of capsules from the lower end of the supply path. A groove for receiving capsules falling from the lower end of the supply path is formed in a capsule receiving table. In synchronism with the vertical motion of the magazine, a push transfer mechanism lays a capsule falling from the lower end of the supply path into the groove of the capsule receiving table, and pushes the capsule in the extending direction of the groove. A groove communicating with the groove of the capsule receiving table is formed in a weighing table. The weighing table weighs the capsule pushed from the capsule receiving table by the push transfer mechanism. A discharge member discharges the weighed capsule. The weight of each capsule is rapidly measured while a high measurement accuracy is maintained.

11 Claims, 10 Drawing Sheets

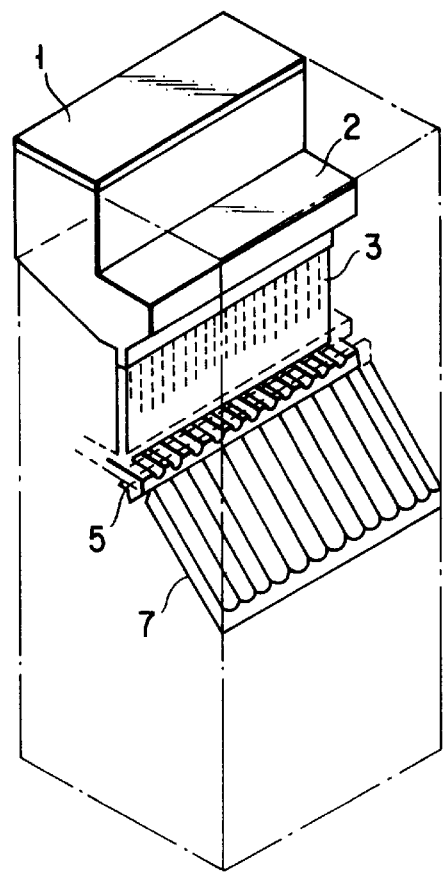
F I G. 3
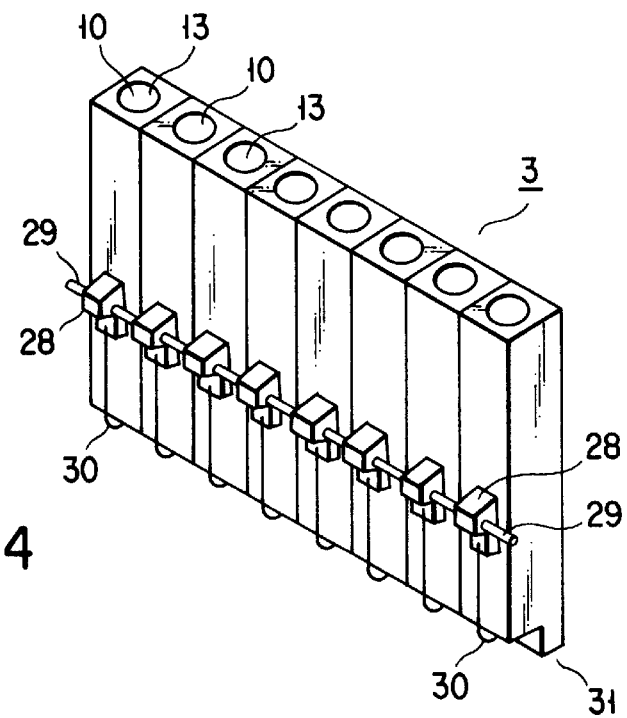
F I G. 4

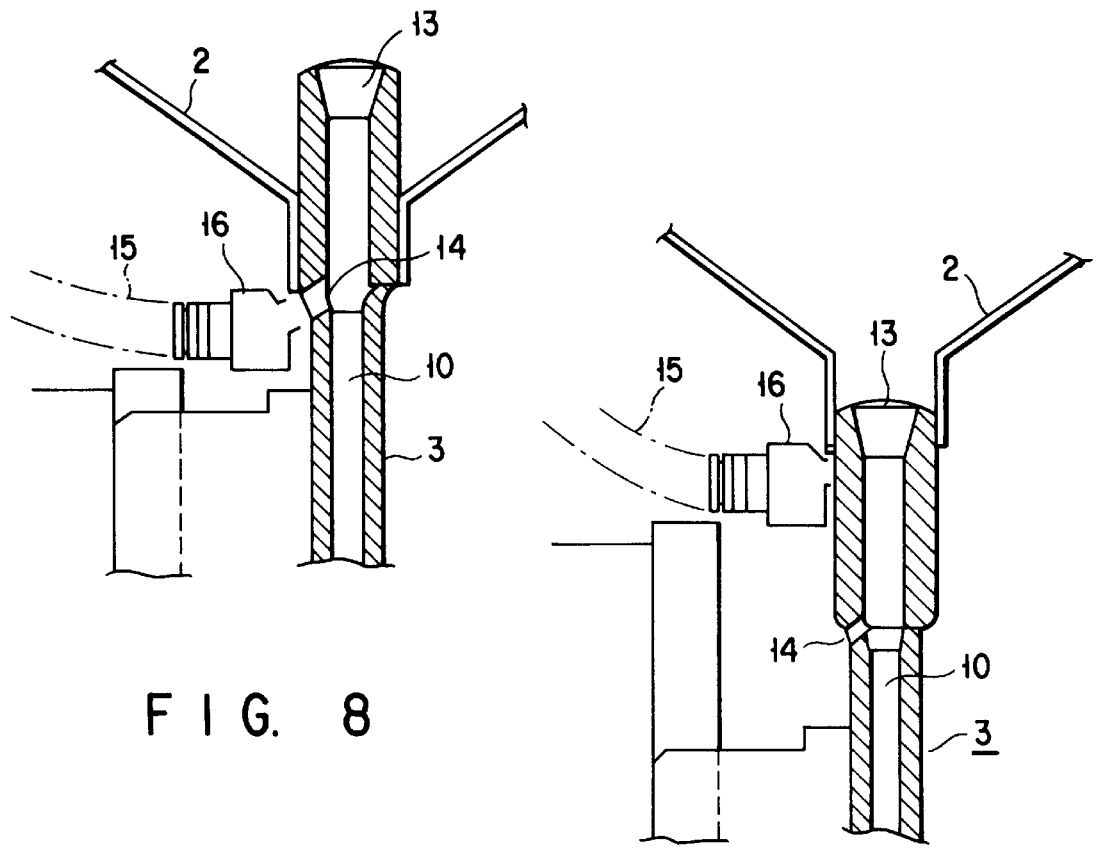
FIG. 8
FIG. 9
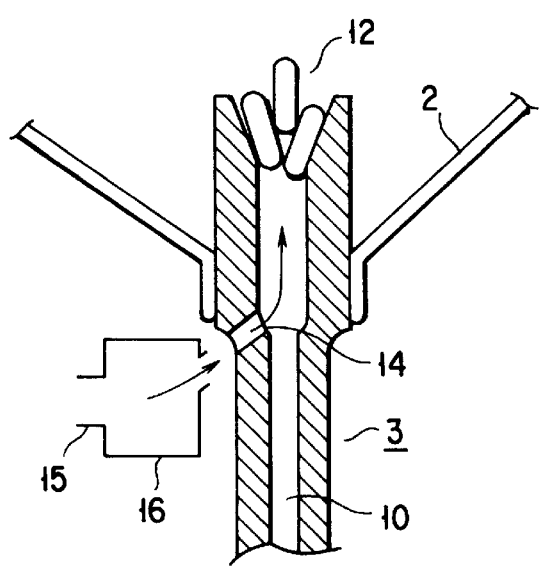
FIG. 10

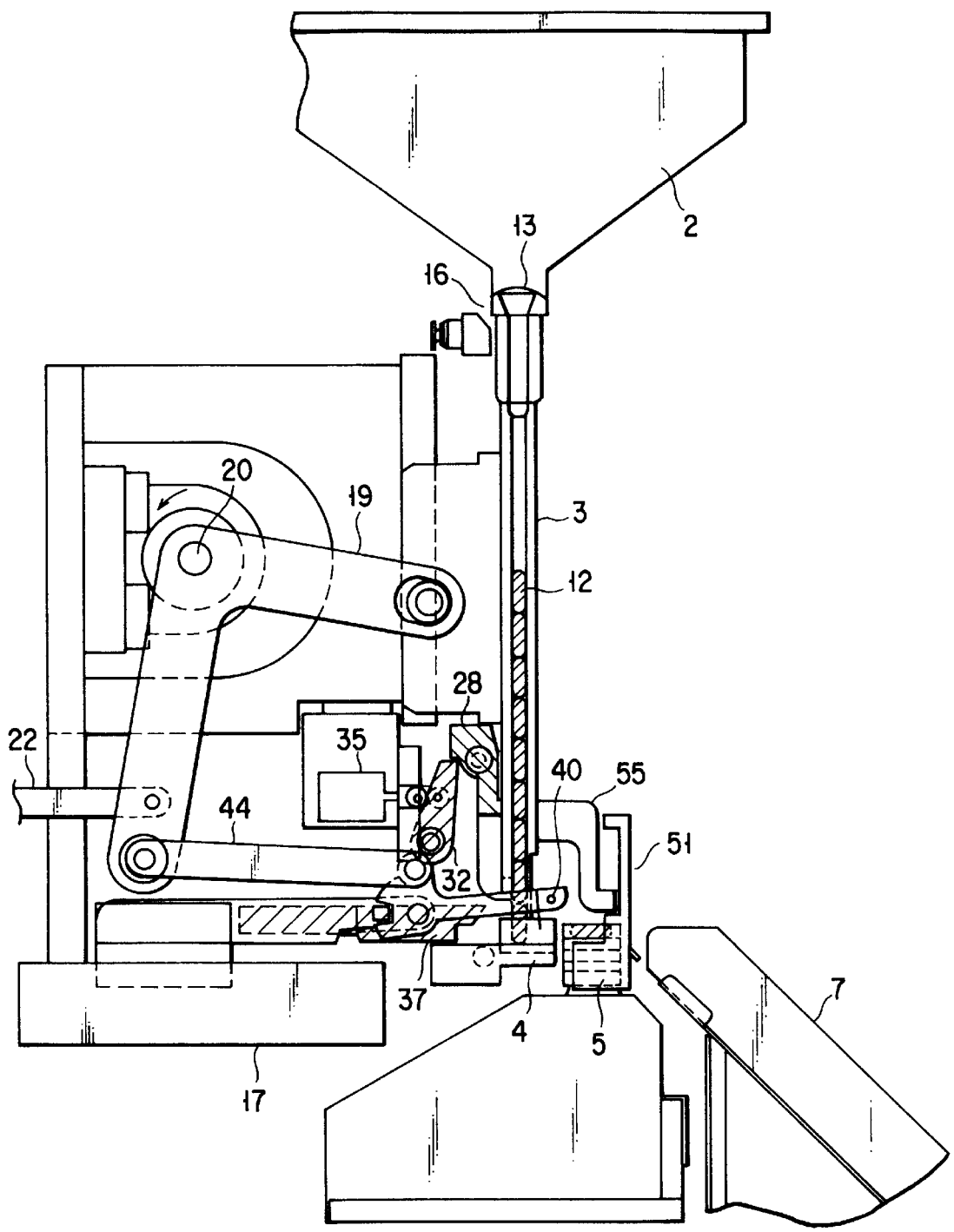
F I G. 11

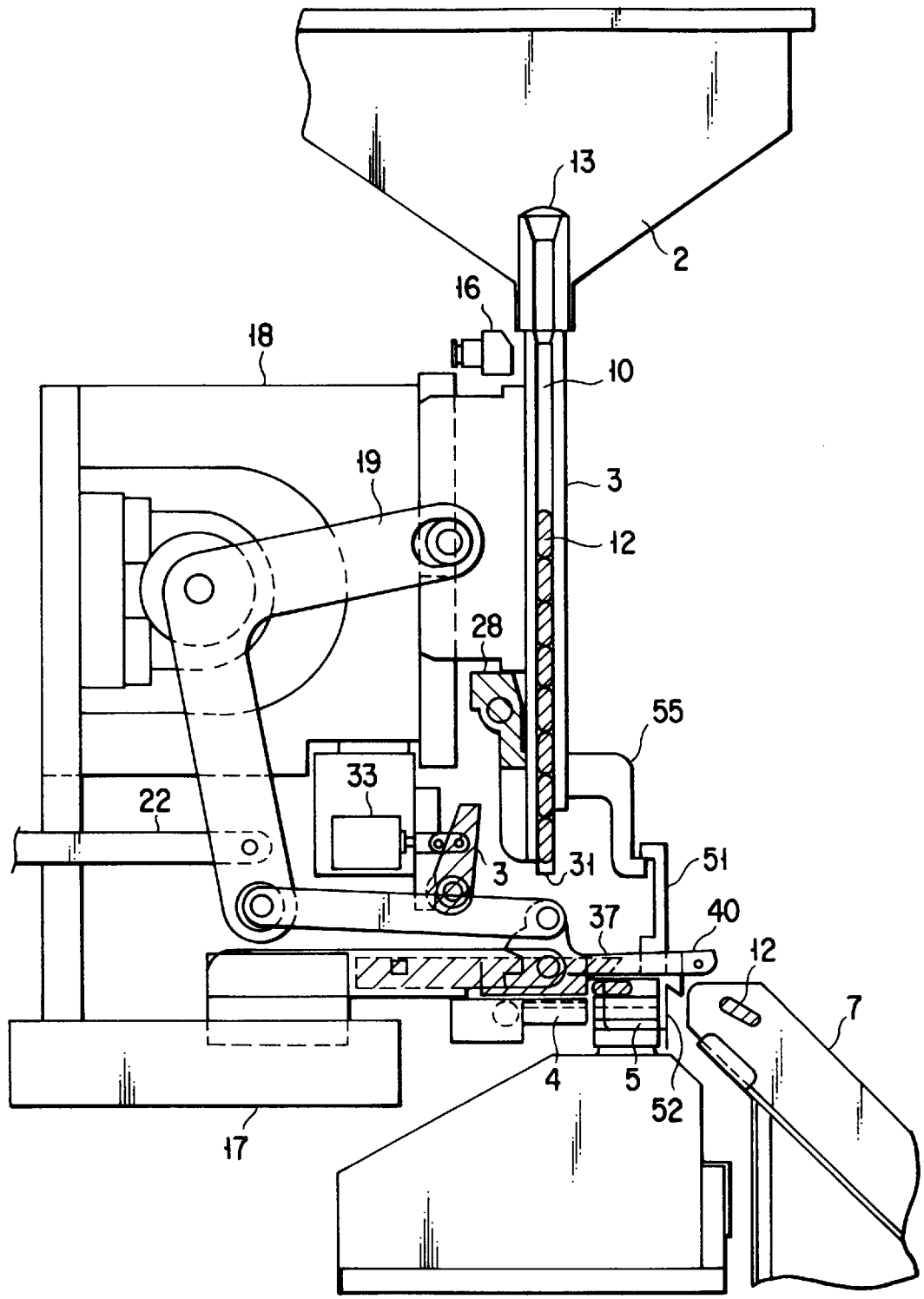
F I G. 13

CAPSULE WEIGHT MEASURING APPARATUS

BACKGROUND OF THE INVENTION

The present invention relates to a capsule weight measuring apparatus and, more particularly, to a capsule weight measuring apparatus for rapidly measuring the weight of a cylindrical capsule which has two semispherical end portions and in which a powder medicine or the like is encapsulated.

Generally, pharmaceutical companies manufacture so-called capsule medicines by encapsulating prepared powder medicines and the like in cylindrical capsules (e.g., capsule Nos. 00.0 and 1 to 5, and capsule Nos. A, B, and C) made from hard gelatin or the like and having two semispherical end portions, and market the resultant medicines under strict quality control.

In pharmaceutical companies, therefore, it is necessary to measure the weight of each of a large number of manufactured capsules, check whether each measured value is within the tolerance, and select capsules falling outside the tolerance.

To rapidly and accurately measure the weight of each of a large number of capsules, it is necessary to efficiently place each capsule on a weighing table of a weighing mechanism and efficiently discharge each measured capsule from the weighing table.

In conventional capsule weight measuring apparatuses for measuring the weight of each of a large number of capsules, cylindrical capsules contained in a hopper are guided one by one to a portion below the hopper through a pipe having an inner diameter slightly larger than the outer diameter of the capsule, and dropped one by one from the lower end of the pipe onto a receiving table. The capsules dropped on this receiving table are guided in order to a weighing table by a lever or the like, and the weight of each capsule is measured on the weighing table.

When the measurement is complete, the measured capsule is transferred from the weighing table to a selector.

The selector selects capsules by checking, on the basis of an output measurement signal from the weighing table, whether the weight of each capsule is within the tolerance.

For example, in an intermittent feeder of an automatic capsule weight selector disclosed in Jpn. UM Appln. KOKOKU Publication No. 52-39961, capsules are uprightly guided one by one into a supply pipe as an automatic capsule supply unit and uprightly guided one by one onto a receiving table from the lower end of the supply pipe. These capsules are uprightly dropped in order from the receiving table to a weighing table by an intermittent feed pusher, and the weight of each capsule is measured.

Also, in a capsule selecting apparatus disclosed in U.S. Pat. No. 4,176,526, pressurized air is supplied from a pipe connected to a vertically moving supply pipe in order to eliminate the clogging of the upper end of the supply pipe with capsules.

The capsule weight measuring apparatus incorporated into the weight selector described above, however, still has the following problems to be solved.

That is, a capsule in which a powder medicine or the like is encapsulated generally has a cylindrical shape with two semispherical end portions, and also has a smooth surface so that a patient can easily swallow it. This shape is very unstable to handle.

For this reason, capsules dropped one by one onto the receiving table from the lower end of the pipe whose upper end communicates with the interior of the hopper readily roll in all directions. Therefore, it is extremely difficult to smoothly transfer these capsules toward the weighing table by using a lever or the like.

Also, the weighing table on which each capsule is placed is made small and light in weight in order to improve the measurement accuracy. Consequently, it is very difficult to rapidly transfer each capsule onto the weighing table and measure the weight of the capsule while making the capsule stand still on the weighing table for a predetermined time.

Accordingly, in the capsule weight measuring apparatus incorporated into the above weight selector, it is very difficult to rapidly measure the weight of each capsule while maintaining a high measurement accuracy.

In the intermittent feeder of the automatic capsule weight selector disclosed in Jpn. UM Appln. KOKOKU Publication No. 52-39961, capsules are uprightly guided one by one from the lower end of the supply pipe onto the receiving table and uprightly dropped in order from the receiving table onto the weighing table, and the weight of each capsule is measured. Therefore, the state of each capsule is unstable, and a vibration occurs when each capsule is dropped onto the weighing table. Consequently, it is very difficult to rapidly measure the weight of each capsule while keeping a high measurement accuracy.

Furthermore, in the capsule selecting apparatus disclosed in U.S. Pat. No. 4,176,526 described above, pressurized air is supplied from the pipe connected to the vertically moving supply pipe in order to eliminate the clogging of the upper end of the supply pipe with capsules. For this purpose, an air blow pipe must always be connected directly to the vertically moving supply pipe, as an automatic capsule supply unit, for guiding capsules one by one to a portion below a hopper. This complicates a piping support structure and its handling.

BRIEF SUMMARY OF THE INVENTION

It is an object of the present invention to solve the problems of the conventional techniques as described above and provide a capsule weight measuring apparatus capable of rapidly measuring the weight of a capsule while maintaining a high measurement accuracy by improving the shapes of a capsule receiving table and a weighing mechanism.

According to a first aspect of the present invention, there is provided a capsule weight measuring apparatus comprising: a capsule supply unit for supplying a plurality of capsules one by one; a capsule receiving unit including a first guide portion having a shape by which one of the capsules supplied one by one from the capsule supply unit can be received in a lying state, rolling of the capsule can be inhibited, and the capsule can be discharged along a longitudinal direction thereof while being held in the lying state; a weighing unit including a second guide portion having a shape by which the capsule discharged from the first guide portion of the capsule receiving unit can be received while being held in the lying state, a weight of the capsule can be measured, and a measured capsule can be discharged; a transfer unit for pushing the capsule, received in the lying state by the first guide portion of the capsule receiving unit, to the second guide portion of the weighing unit while holding the capsule in the lying state; and a discharge unit for discharging the measured capsule from the second guide portion of the weighing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a perspective view showing the main parts of the weight selector in FIG. 1;

FIG. 4 is a perspective view showing a magazine in the capsule weight measuring apparatus of FIG. 1;

FIG. 8 is a sectional view showing the positional relationship between the upper end opening of a supply path of the magazine and a second hopper in the capsule weight measuring apparatus of FIG. 1;

FIG. 9 is a sectional view showing the positional relationship between the upper end opening of the supply path of the magazine and the second hopper in the capsule weight measuring apparatus of FIG. 1;

FIG. 10 is a view for explaining the operation of a communication hole provided in the supply path of the magazine and a nozzle in the capsule weight measuring apparatus of FIG. 1;

FIG. 11 is a side view showing the overall operation of the capsule weight measuring apparatus in FIG. 1;

FIG. 13 is a side view showing the overall operation of the capsule weight measuring apparatus in FIG. 1;

DETAILED DESCRIPTION OF THE INVENTION

Figure 1:
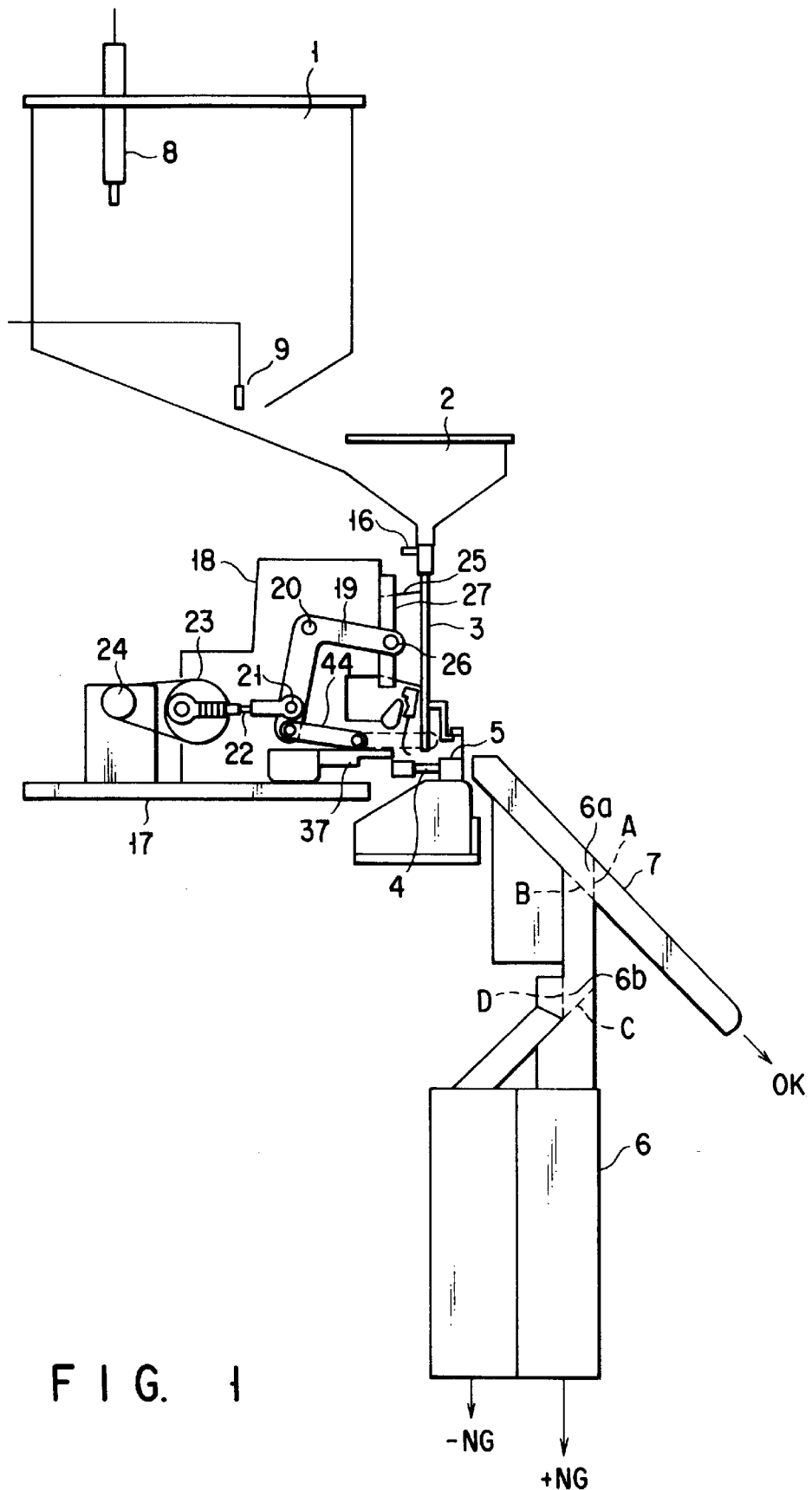
FIG. 1 is a side view showing the schematic arrangement of a weight selector incorporating a capsule weight measuring apparatus according to one embodiment of the present invention.

Reference will now be made in detail to the presently preferred embodiments of the present invention as illustrated in the accompanying drawings, in which like reference characters designate like or corresponding parts throughout the several drawings.

The outline of the present invention will be described first. A capsule weight measuring apparatus according to the present invention comprises a magazine, a stopper, a capsule receiving table, a push transfer mechanism, a weighing mechanism, and a discharge mechanism. The magazine communicates with the bottom of a hopper which contains capsules. In this magazine, a supply path which vertically extends through the magazine and through which capsules are dropped in their longitudinal direction is formed. The magazine is periodically moved vertically. The stopper is provided near the lower end of the supply path of the magazine and stops the falling of a capsule from the lower end of the supply path when the magazine comes off the lower end position of the vertical motion. The capsule receiving table is provided below the magazine and has a groove for receiving capsules falling from the lower end of the supply path. The push transfer mechanism is also provided below the magazine and, in synchronism with the vertical motion of the magazine, lays a capsule falling from the lower end of the supply path into the groove of the capsule receiving table and pushes the capsule in the extending direction of the groove. The weighing mechanism is arranged adjacent to the capsule receiving table and has a groove communicating with the groove of the capsule receiving table. The weighing mechanism weighs a capsule pushed from the capsule receiving table by the push transfer mechanism. The discharge mechanism discharges a capsule weighed by the weighing mechanism.

In the present invention, the above capsule weight measuring apparatus further comprises, where necessary, a stopper fixing mechanism for maintaining the stopper in the capsule falling stop state.

In the present invention, the above capsule weight measuring apparatus further comprises a shutter which operates in synchronism with the push transfer mechanism and prevents a capsule pushed toward the weighing mechanism by the push transfer mechanism, while the magazine is moved upward, from springing out of the weighing mechanism.

In the present invention, the above capsule weight measuring apparatus further comprises a communication hole and an upper air blow mechanism. The communication hole is formed in the vicinity of the upper end of the magazine and allows the supply path to communicate with the outside. The upper air blow mechanism is disposed in a position where the mechanism opposes the Thy communication hole while the magazine is in the upper end position. This upper air blow mechanism applies pressurized air into the supply path through the communication hole.

Also, in the above capsule weight measuring apparatus of the present invention, the sectional shape of the grooves formed in the capsule receiving table and the weighing mechanism has a pair of inclined sides for supporting a laid capsule at two points, and a fine groove is formed at the intersection of the pair of inclined sides. Furthermore, a lower air blow mechanism applies pressurized air into this fine groove.

In the capsule weight measuring apparatus with the above construction, each of capsules contained in the hopper falls through the supply path of the magazine which is vertically moving.

When the magazine reaches the lower end, the stopper opens, and the capsule falls into the groove of the capsule receiving table below the magazine.

Simultaneously, the push transfer mechanism is driven to lay the capsule falling into the groove, push the capsule in the extending direction of the groove, and transfer the capsule to the adjacent weighing mechanism.

The weighing mechanism measures the weight of the capsule, and the capsule whose weight is measured is discharged by the discharge mechanism.

In the present invention as described above, the grooves communicating with each other are formed in the capsule receiving table and the weighing mechanism. Therefore, when the push transfer mechanism brings down a capsule, this capsule falls such that its longitudinal direction is consistent with the extending direction of the grooves. Accordingly, the capsule falling in the direction of the grooves can be easily and reliably pushed toward the weighing mechanism.

The present invention further includes the stopper fixing mechanism for maintaining the stopper in the capsule falling stop state in addition to the above construction. Therefore, the adjustment or maintenance inspection, for example, of the weighing mechanism can be executed while no capsules are loaded into the weighing mechanism by stopping the falling of capsules.

Also, in a case of a plurality of magazines in which capsule supply pathes are formed, a plurality of stopper fixing mechanism, a plurality of weighing mechanisms and a plurality of selectors, without loading capsules into some trouble weighing mechanisms or selectors by some stopper fixing mechanisms, remain weighing mechanism or selector can be continuously executed weighing or selecting of capsules.

The present invention further includes the shutter in addition to the above construction. While the magazine is moved upward, i.e., during a period in which a capsule to be measured is loaded into the weighing mechanism and measured, the shutter prevents the capsule pushed toward the weighing mechanism by the push transfer mechanism from springing out of the weighing mechanism. Accordingly, even when the push transfer mechanism rapidly discharges a capsule toward the weighing mechanism, this capsule before being measured does not spring out of the weighing mechanism.

The present invention further includes the upper air blow mechanism in addition to the above construction. When the upper end opening of the supply path of the magazine clogs with capsules in the hopper and these capsules do not reach the capsule receiving table and the weighing mechanism below the magazine, the air blow mechanism applies pressurized air into the supply path through the communication hole to remove the capsules from the upper end opening.

Also, the present invention further includes the lower air blow mechanism and the fine grooves in the lower ends of the grooves formed in the capsule receiving table and the weighing mechanism. Therefore, when dust deposits in the grooves of the capsule receiving table and the weighing mechanism, for example, the lower air blow mechanism applies pressurized air into the fine grooves to blow off the dust deposit in the grooves, thereby performing a cleaning operation.

By performing this cleaning operation at a predetermined period, it is possible to always keep the weighing mechanism clean and maintain a high measurement accuracy.

One embodiment of the present invention based on the above outline will be described below with reference to the accompanying drawings.

FIG. 1 is a side view showing the schematic arrangement of a weight selector incorporating a capsule weight measuring apparatus according to this embodiment.

FIG. 3 is a perspective view showing the main parts of the capsule weight measuring apparatus in FIG. 1.

Referring to FIGS. 1 and 3, a first hopper 1 containing a large number of capsules is provided in the upper portion of the housing of the weight selector indicated by the alternately long and short dashed lines in FIG. 3.

A second hopper 2 having a funnel-like bottom opening and connected to the first hopper 1 is provided in front of and below the first hopper 1.

A plurality of magazines 3 in which capsule supply paths are formed, as will be described later, are so arranged as to be vertically movable below the funnel-like bottom opening of the second hopper 2.

A capsule receiving table 4 and weighing tables 5 of a plurality of weighing mechanisms are provided below the magazines 3.

A guide 7 for guiding capsules to a selector 6 for selecting capsules whose weights are measured is provided in front of and below the weighing tables 5.

The first hopper 1 includes an upper-limit sensor 8 and a lower-limit sensor 9 for appropriately controlling the number of capsules contained in the first hopper 1.

Figure 2:
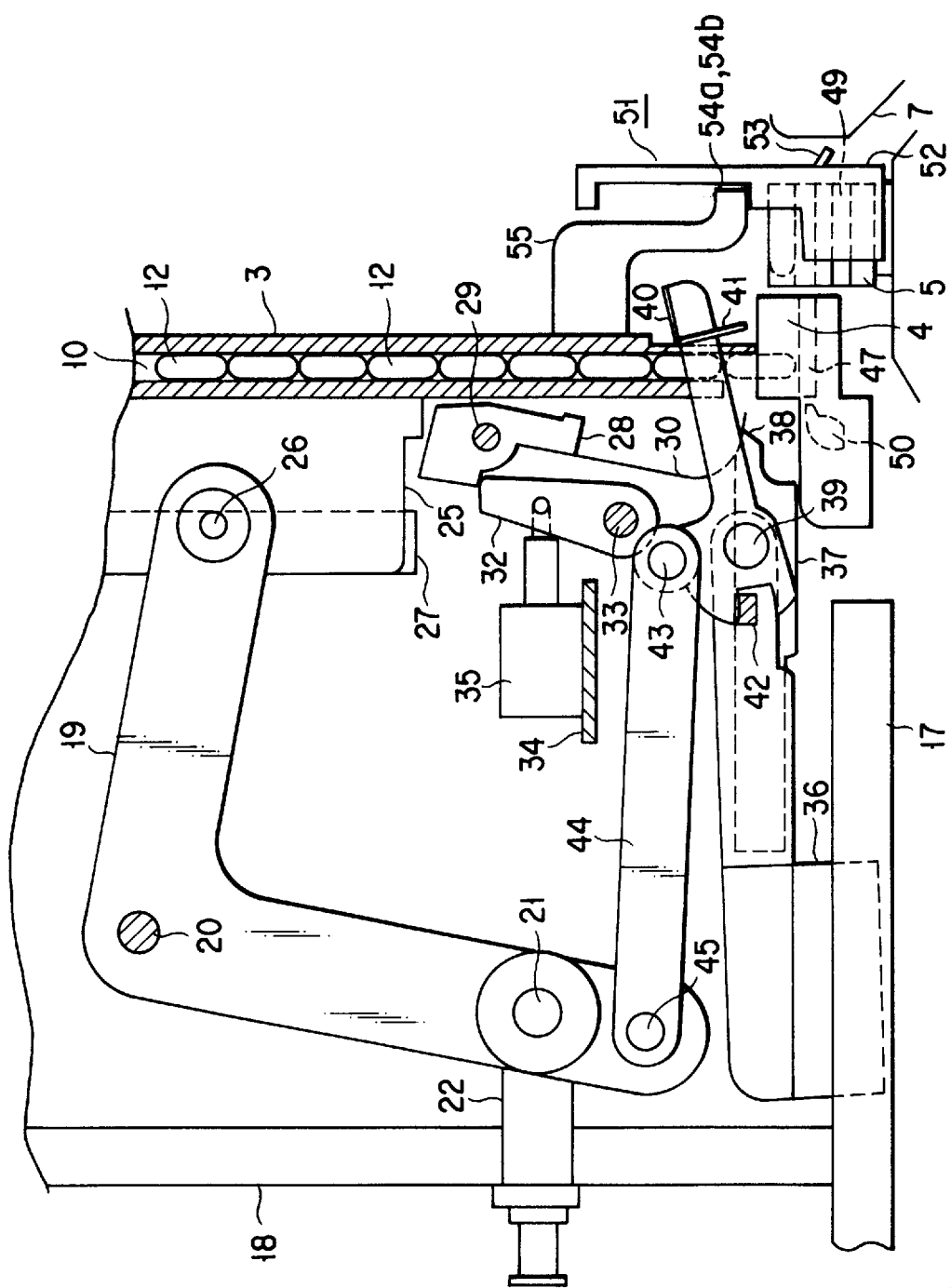
FIG. 2 is a side view showing the main components of the capsule weight measuring apparatus in FIG. 1.

As shown in FIGS. 2 and 4, a plurality of vertically extending supply paths 10 are formed inside the magazine 3.

The inner diameter of the supply path 10 is set to be slightly larger than the outer diameter of a predetermined capsule 12 to be weighed so that the capsule 12 enters the supply path 10 in the longitudinal direction.

As shown in FIG. 8, an upper end opening 13 of the supply path 10 of the magazine 3 opposes the bottom opening of the second hopper 2.

In order for the capsules 12 contained in the second hopper 2 to readily enter the supply path 10 of the magazine 3, the upper end opening 13 is tapered and has diameter larger than the diameter of the central portion of the supply path 10.

The magazine 3 vertically moves at a predetermined period so as to move forward and backward with respect to the bottom opening of the fixed second hopper 2.

FIG. 8 is a sectional view showing the state in which the magazine 3 reaches the upper end. The upper end opening 13 of the supply path 10 enters and largely rises from the bottom opening of the second hopper 2.

On the other hand, FIG. 9 is a sectional view showing the state in which the magazine 3 reaches the lower end. The upper end opening 13 of the supply path 10 retracts from the bottom opening of the second hopper 2 to the lower end position.

As shown in FIGS. 8 and 9, a communication hole 14 communicating with the outside of the magazine 3 is formed near the upper end opening 13 of the supply path 10.

Additionally, a nozzle 16 as an upper air blow mechanism for applying pressurized air, supplied from the outside through a pipe 15, to the supply path 10 through the communication hole 14 is disposed near the lower end of the second hopper 2.

As described above, the magazine 3 moves up and down. Therefore, as shown in FIG. 8, at the timing the magazine 3 reaches the upper end, the nozzle 16 and the communication hole 14 oppose each other, and, where necessary as will be described later, pressurized air can be injected from the nozzle 16 into the supply path 10 at this timing.

Since the nozzle 16 and the communication hole 14 are thus provided, when the upper end opening 13 of the supply nozzle 10 clogs with the capsules 12 as shown in FIG. 10, the nozzle 16 applies pressurized air into the supply path 10.

Consequently, the capsules 12 in the upper end opening 13 can be scattered into the second hopper 2.

A vertical moving mechanism of the magazine 3 and a transfer mechanism for transferring the capsule 12 from the lower end of the supply path 10 of the magazine 3 will be described below with reference to FIGS. 1 and 2.

A central portion of an L-shaped arm 19 is axially supported to be pivotal about a shaft 20 of a fixed base plate 18 fixed to a frame 17 of the weight selector housing.

One end of a crank shaft 22 is pivotally supported by a shaft 21 at the lower end of the L-shaped arm 19.

The other end of the crank shaft 22 is axially supported by one portion on the circumference of a rotary disk 23 pivotally supported by the fixed base plate 18.

This rotary disk 23 is rotated via a belt 23a by a driving motor 24 mounted on the frame 17.

A shaft 26 provided at the other end of the L-shaped arm 19 is locked with a slight margin in a hole formed in a support plate 25 fixed to the magazine 3.

Accordingly, when the driving motor 24 is driven, the L-shaped arm 19 pivots clockwise and counter-clockwise about the shaft 20, and the support plate 25 locked by the shaft 26 at the other end of the L-shaped arm 19 moves up and down along a guide 27. As a consequence, the magazine 3 also moves up and down.

As shown in FIGS. 2 and 4, in a lower portion inside the housing of the magazine 3 in which a number of supply paths 10 are formed, pivoting members 28 are axially supported by a common shaft 29 in a one-to-one correspondence with the support paths 10.

The common shaft 29 is fixed to the magazine 3 or the support plate 25.

The upper end of a stopper 30 bent into an almost L shape is fixed to each pivoting member 28.

In a normal state, the pivoting members 28 are biased counter-clockwise with respect to the common shaft 29 by coil springs (not shown).

Consequently, in this normal state, each stopper 30 closes a lower end opening 31 of the supply path 10, so the capsule 12 does not fall from this lower end opening 31 onto the capsule receiving table 4.

Additionally, stopper locking members 32 for selectively locking the pivoting members 28 are pivotally supported by a common shaft 33 fixed to the fixed base plate 18 in a one-to-one correspondence with the supply paths 10.

Furthermore, a plurality of solenoids 35 for selectively stopping the locking operations by the stopper locking members 32 with respect to the pivoting members 28 are mounted on a support plate 34 fixed to the fixed base plate 18.

Accordingly, these solenoids 35 constitute a stopper fixing mechanism.

That is, while no power is supplied to the solenoid 35, the stopper locking member 32 abuts against the pivoting member 28, as shown in FIG. 2, when the magazine 3 moves down to the lower end position, and makes this pivoting member 28 pivot clockwise against the coil spring.

Consequently, the stopper 30 comes off the position of the lower end opening 31 of the supply path 10, and only the lowermost one of a number of capsules 12 staying in the supply path 10 falls from the lower end opening 31 onto the capsule receiving table 4.

On the other hand, when power is supplied to the solenoid 35, the plunger of the solenoid 35 is attracted, and the stopper locking member 32 pivots counter-clockwise and stops.

As a consequence, even when the magazine moves down to the lower end position, the stopper locking member 32 does not contact the pivoting member 28. Accordingly, the pivoting member 28 does not pivot, so the stopper 30 does not come off the position of the lower end opening 31 of the supply path 10.

By supplying power to the solenoid 35, therefore, the supply of the capsule 12 to the weighing table 5 can be stopped at an arbitrary timing.

Figure 5:
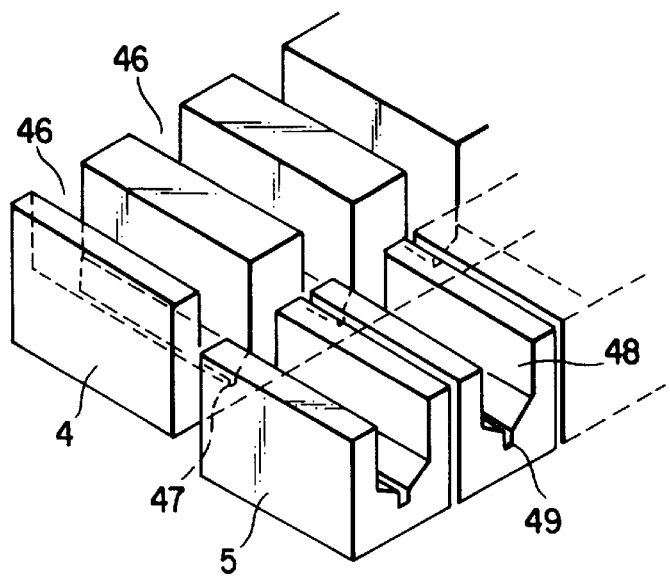
FIG. 5 is a perspective view showing a capsule receiving table and weighing tables in the capsule weight measuring apparatus of FIG. 1.

As shown in FIG. 5, in the capsule receiving table 4 provided below the lower end openings 31 of the supply paths 10 of the magazine 3, grooves 46 having a V-shaped bottom are formed at positions where the grooves 46 oppose the lower end openings 31.

Furthermore, a fine groove 47 is formed in the lowest end of each groove 46.

As described above, the capsule 12 falls from the lower end opening 31 of each supply path 10 of the magazine 3 into the groove 46 of the capsule receiving table 4.

The separate weighing tables 5 are provided in the extending direction of the grooves 46 of the capsule receiving table 4 in a one-to-one correspondence with these grooves 46.

A groove 48 and a fine groove 49 having the same sectional shape as the groove 46 formed in the capsule receiving table 4 are formed in the upper surface of each weighing table 5 so as to oppose and communicate with the groove 46.

One capsule 12 is placed in the groove 48, and the weight of this capsule 12 is measured.

Referring to FIG. 2, a pusher 37 whose moving direction is regulated in a horizontal direction by a slide guide 36 which moves parallel to the frame 17 is incorporated.

A plurality of tips 38 are formed at one end of the pusher 37 on the side of the magazine 3. Each tip 38 lays the capsule 12, falling from the lower end opening 31 of the supply path 10 into the groove 46 formed in the capsule receiving table 4, in the direction of the groove 46.

One end of each of discharge members 40 for pushing the measured capsules 12 from the weighing tables 5 is pivotally attached to a shaft 39 provided in a middle position of the pusher 37.

Figure 6:
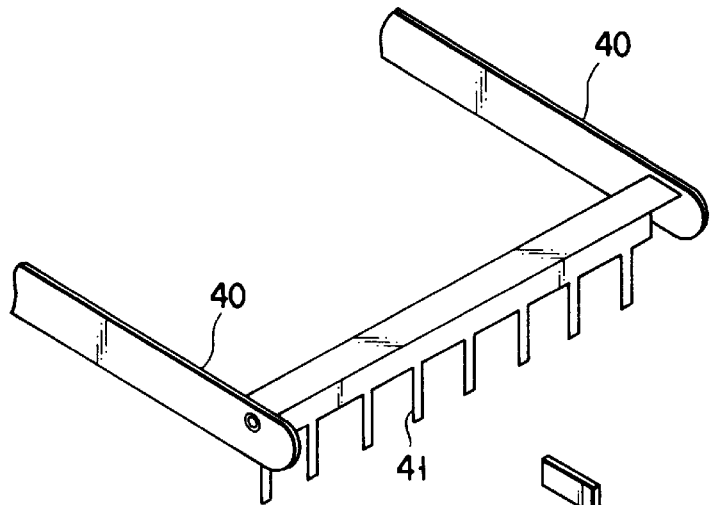
FIG. 6 is a perspective view showing discharge members in the capsule weight measuring apparatus of FIG. 1.

As shown in FIG. 6, discharge bars 41 for discharging the measured capsules 12 from the grooves 48 of the weighing tables 5 to the guide 7 of the selector 6 extend downward from the other end (distal end) of each discharge member 40.

The range of the pivot angle of the discharge members 40 is regulated by a stopper pin 42 formed on the fixed base plate 18.

A shaft 43 provided near the shaft 39 of the discharge members 40 and a shaft 45 provided at the lower end of the L-shaped arm 19 are connected by a connecting plate 44.

Accordingly, when the L-shaped arm 19 further pivots counter-clockwise from the state shown in FIG. 2, the connecting plate 44 moves toward the magazine 3 to make the discharge members 40 pivot clockwise about the shaft 39.

As a result, the discharge bars 41 at the ends of the discharge members 40 enter the grooves 48 of the weighing tables 5.

That is, the discharge members 40 are leveled.

The pivoting angle of the discharge members 40, however, is regulated by the stopper pin 42 formed on the fixed base plate 18. Therefore, when the connecting plate 44 further moves toward the magazine 3, the pusher 37 and the discharge members 40 move in the direction of the magazine 3 while the discharge members 40 are kept leveled.

Consequently, the tips 38 of the pusher 37 push the upper end portions of the capsules 12, falling into the grooves 46 formed in the capsule receiving table 4, in the direction of the grooves 46, thereby laying the capsules 12 along the grooves 46. Also, step portions below the tips 38 push the capsules 12 thus laid into the grooves 48 of the weighing tables 5.

Simultaneously, the discharge bars 41 at the ends of the discharge members 40 discharge the measured capsules 12 remaining in the grooves 48 of the weighing tables 5 to the guide 7 of the selector 6.

Accordingly, the pusher 37 constitutes a push transfer mechanism which, in synchronism with the vertical motion of the magazine 3, lays the capsules 12 falling from the lower end openings 31 of the supply paths 10 into the grooves 46 of the capsule receiving table 4 and pushes the capsules 21 in the extending direction of the grooves. The discharge members 40 constitute a discharge mechanism for discharging the capsules 12 weighed by the weighing mechanism.

A nozzle 50 is provided in a position where the nozzle 50 opposes the fine groove 47 formed in the bottom of each groove 46 of the capsule receiving table 4 and opposes the fine groove 49 formed in the bottom of the groove 48 of each weighing table 5. This nozzle 50 functions as a lower air blow mechanism for applying pressurized air to these fine grooves 47 and 49.

By applying pressurized air from this nozzle 50 into the fine grooves 47 and 49, therefore, a cleaning operation of blowing off dust deposited in the grooves 46 and 48 of the capsule receiving table 4 and the weighing table 5 can be performed.

Also, a vertically movable shutter 51 is provided between the weighing tables 5 and the guide 7 of the selector 6.

Figure 7:
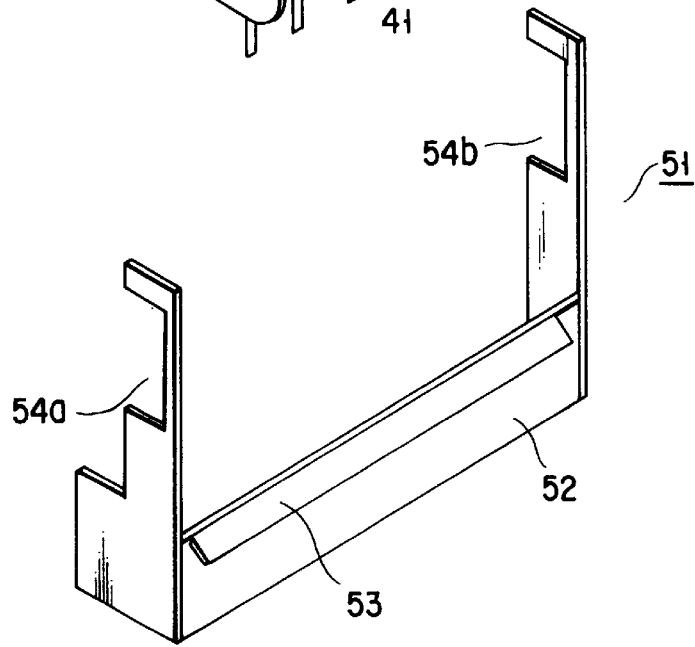
FIG. 7 is a perspective view showing a shutter in the capsule weight measuring apparatus of FIG. 1.

As shown in FIG. 7, an inclined plate 53 for smoothly guiding the capsules 12 to the guide 7 is formed at the upper end of a shutter plate 52 of the shutter 51.

Engaging portions 54a and 54b are formed in side plates of the shutter 51.

The end portions of support plates 55 fixed to the magazine 3 are engaged by these engaging portion 54a and 54b.

As shown in FIG. 2, when the magazine 3 is close the lower end position, the groove 48 of each weighing table 5 does not oppose the shutter plate 52, i.e., the front end of the groove 48 of each weighing table 5 is open.

When the magazine 3 moves upward, the shutter plate 52 is lifted upward to cover the front end of the groove 48 of each weighing table 5.

The operation of the capsule weight measuring apparatus with the above construction will be described below with reference to FIGS. 2 and 11 to 15.

As described previously, when the driving motor 24 is activated, the L-shaped arm 19 pivots clockwise and counter-clockwise about the shaft 20.

When the L-shaped arm 19 pivots clockwise and counter-clockwise, the magazine 3 moves up and down at a predetermined period.

The state of the apparatus changes from FIG. 2 to FIGS. 11 through 15.

In the state shown in FIG. 2, the magazine 3 is in the lower end position, the pivoting members 28 abut against the stopper locking members 32, and the stoppers 30 open the lower end openings 31 of the supply paths 10 of the magazine 3.

In this state, only the lowermost one of a large number of capsules 12 stored in each supply path 10 falls into the groove 46 of the capsule receiving table 4.

When the driving motor 24 further rotates, the L-shaped arm 19 starts pivoting counter-clockwise from the state shown in FIG. 2.

Accordingly, the magazine 3 starts rising as shown in FIG. 11.

As a consequence, the pivoting members 28 are unlocked from the stopper locking members 32, and the stoppers 30 close the lower end openings 31 of the supply paths 10, thereby stopping the subsequent falling of the capsules 12.

As shown in FIG. 11, the pusher 37 starts advancing, and the discharge bars 41 at the ends of the discharge members 40 start pivoting downward.

Figure 12:
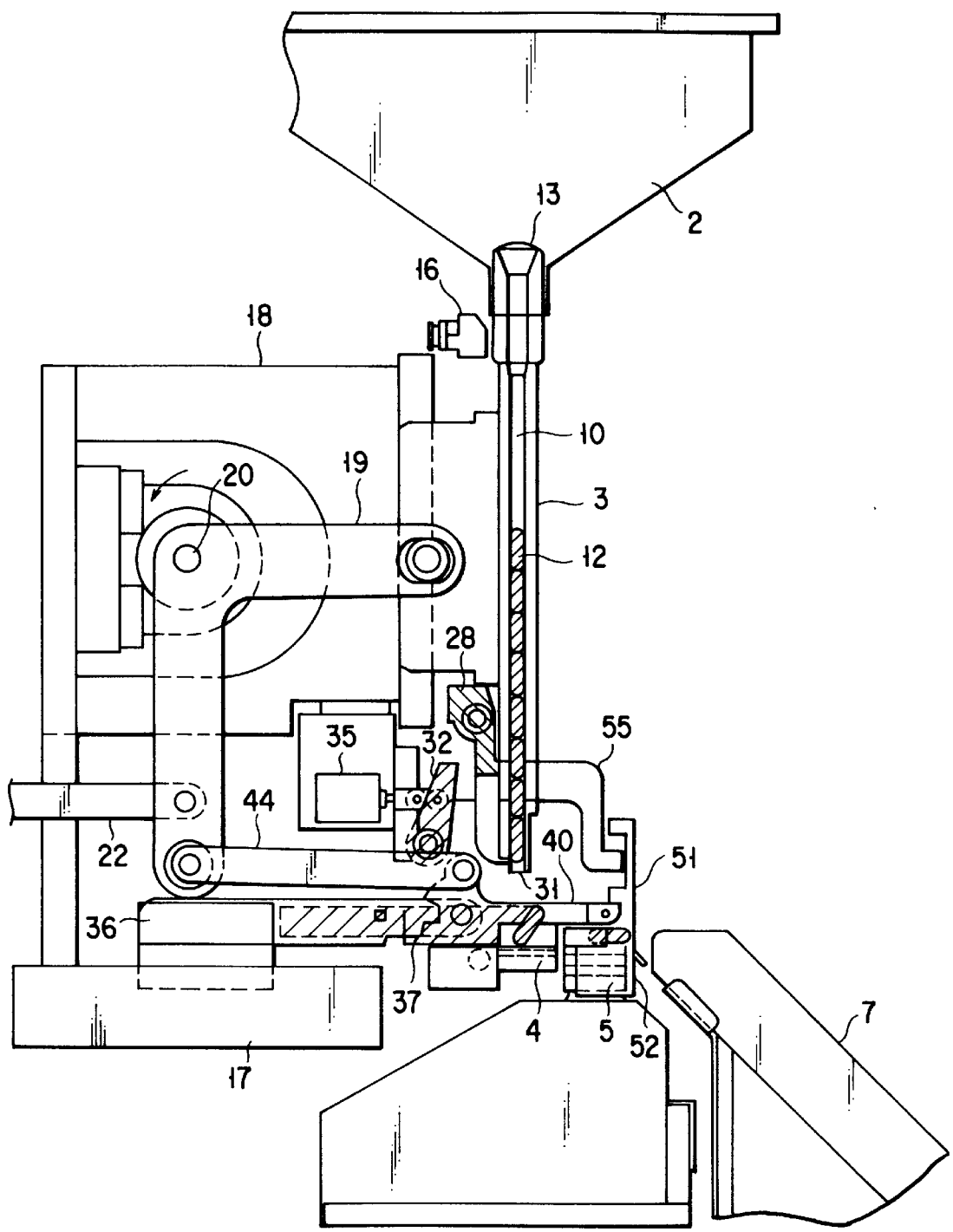
FIG. 12 is a side view showing the overall operation of the capsule weight measuring apparatus in FIG. 1.

When the L-shaped arm 19 further pivots counter-clockwise from the state shown in FIG. 11, the pusher 37 further advances as shown in FIG. 12. Consequently, the tips 38 of the pusher 37 lay the capsules 12, falling into the grooves 46 of the capsule receiving table 4, in the extending direction of the grooves 46.

Simultaneously, the discharge bars 41 at the ends of the discharge members 40 discharge the measured capsules 12 remaining in the grooves 48 of the weighing tables 5 to the guide 7 of the selector 6.

In this state, the shutter plate 52 of the shutter 51 positioned between the weighing tables 5 and the guide 7 is still below the position of the grooves 48 of the weighing tables 5. Therefore, the measured capsules 12 are smoothly discharged to the guide 7.

When the L-shaped arm 19 further pivots counter-clockwise from the state shown in FIG. 12, the pusher 37 further advances as shown in FIG. 13. Consequently, the step portions below the tips 38 of the pusher 37 move the capsules 12, laid in the grooves 46 of the capsule receiving table 4, into the grooves 48 of the weighing tables 5.

Since the magazine 3 further ascends in this state, the shutter plate 52 of the shutter 51 positioned between the weighing tables 5 and the guide 7 rises to the position where the shutter plate 52 opposes the grooves 48 of the weighing tables 5.

Accordingly, even when the pusher 37 is moved fast to thrust away the capsules 12, the shutter plate 52 prevents the capsules 12 from springing out of the grooves 48 of the weighing tables 5.

Subsequently, the measurement of the weight of each capsule 12 is started.

Figure 14:
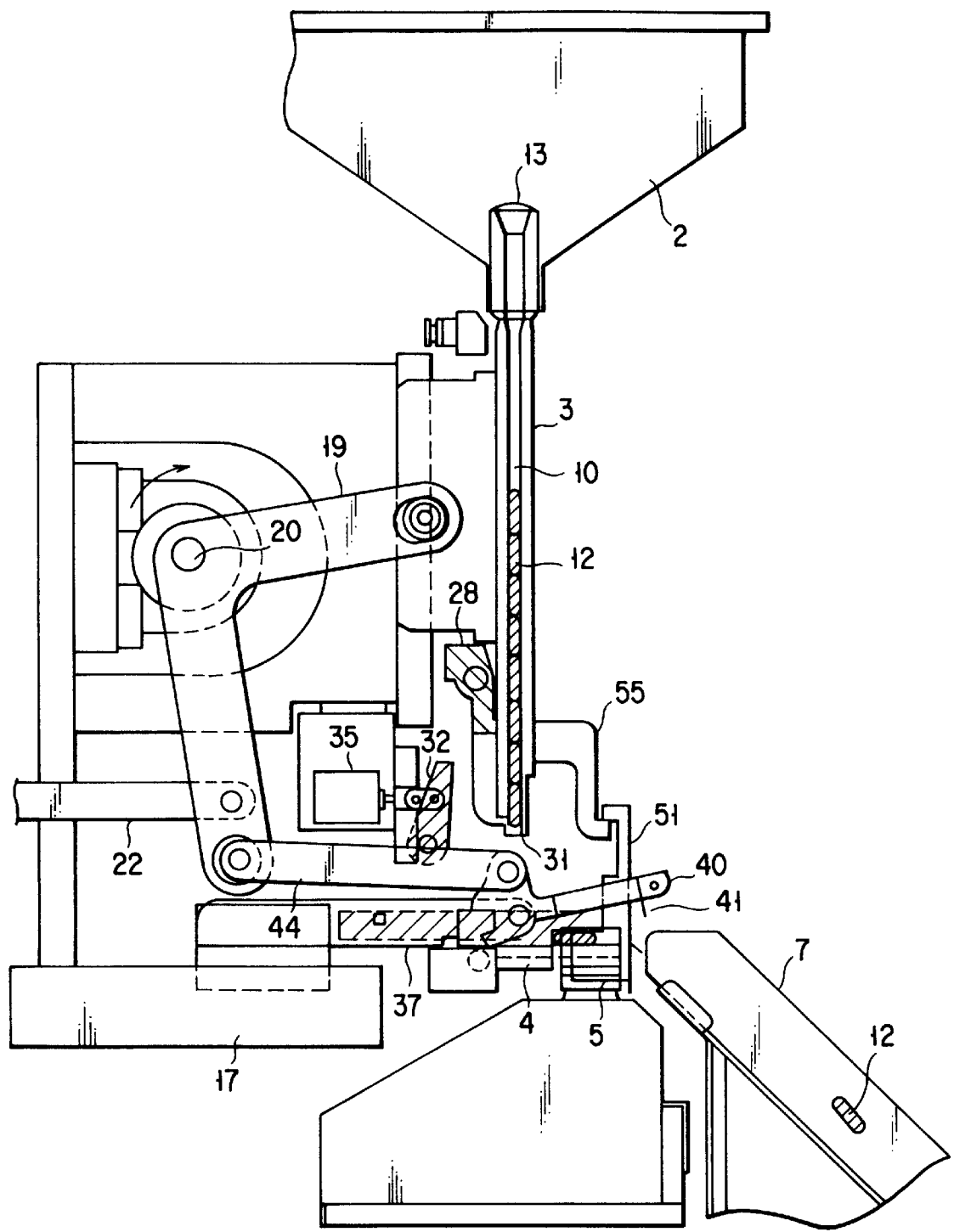
FIG. 14 is a side view showing the overall operation of the capsule weight measuring apparatus in FIG. 1.

When the driving motor 24 further rotates, the pivoting direction of the L-shaped arm 19 is reversed, i.e., the L-shaped arm 19 starts pivoting clockwise, and the operation proceeds on to the state shown in FIG. 14.

When the L-shaped arm 19 starts pivoting clockwise, the connecting plate 44 starts moving backward, and the discharge members 40 pivot counter-clockwise about the shaft 39.

As a result, the discharge bars 41 at the ends of the discharge members 40 move to positions above the grooves 48 of the weighing tables 5.

Thereafter, the magazine 3 starts descending.

Figure 15:
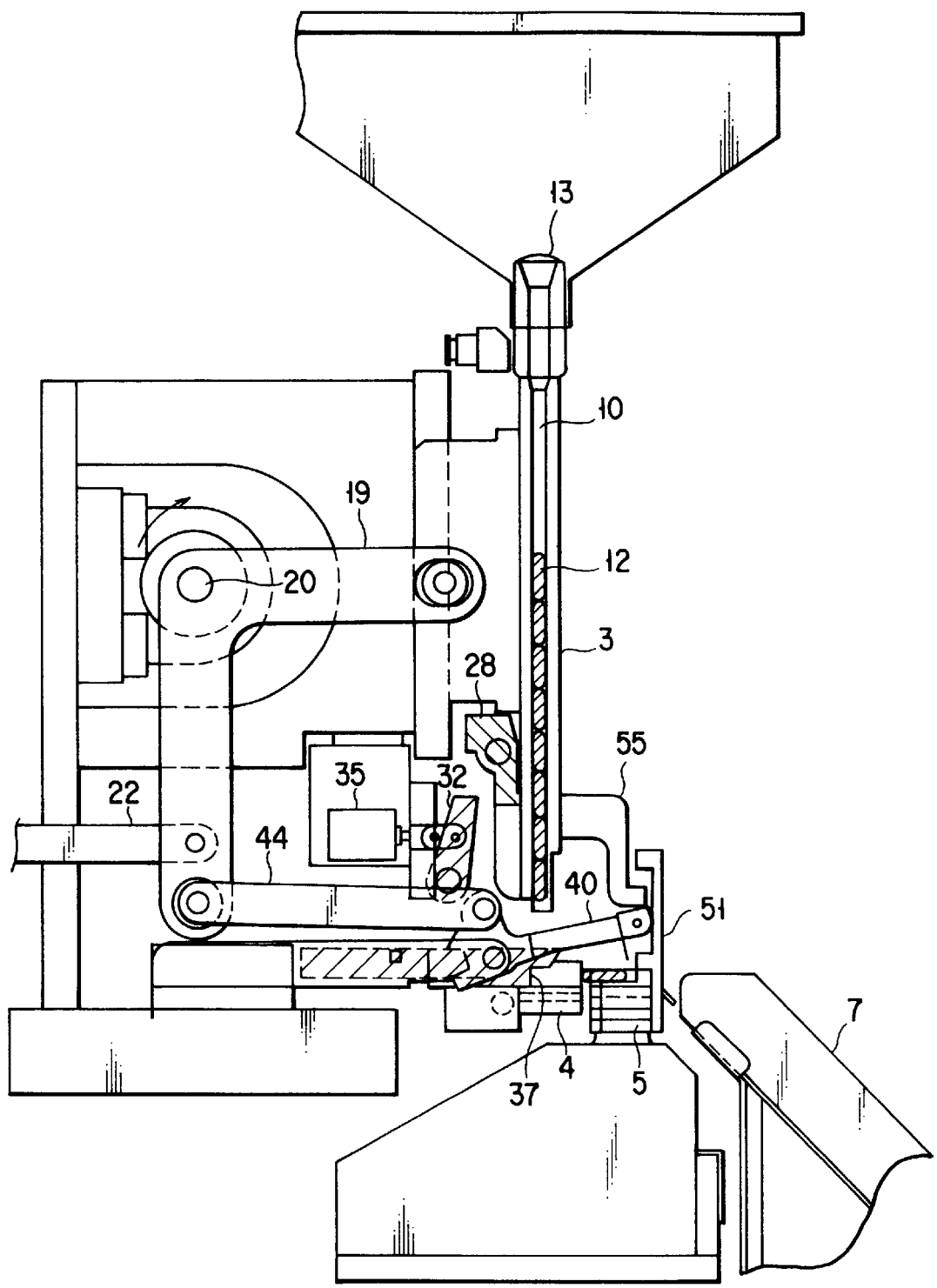
FIG. 15 is a side view showing the overall operation of the capsule weight measuring apparatus in FIG. 1.

When the L-shaped arm 19 further pivots clockwise from the state shown in FIG. 14, the operation proceeds on to the state shown in FIG. 15.

In this state, the counter-clockwise pivot of the discharge members 40 stops, and the pusher 37 starts moving back in synchronism with the backward motion of the connecting plate 44.

Although the magazine 3 further descends, the pivoting members 28 do not contact the stopper locking members 32 yet in this descending position. Therefore, the stoppers 30 keep closing the lower end openings 31 of the supply paths 10 of the magazine 3.

When the L-shaped arm 19 further pivots clockwise from the state shown in FIG. 15, the operation proceeds on to the state shown in FIG. 2 described above.

In this state, the magazine 3 is in the lower end position.

Accordingly, the tips 38 of the pusher 37 are positioned behind the supply paths 10 of the magazine 3, and the pivoting members 28 abut against the stopper locking members 32. Consequently, the stoppers 30 come off the lower end openings 31 of the supply paths 10 of the magazine 3, opening the lower end openings 31.

In the capsule weight measuring apparatus structured as described above, the capsules 12 contained in the second hopper 2 fall through the supply paths 10 of the vertically moving magazine 3.

When the magazine 3 reaches the lower end, each stopper 30 opens to drop only one capsule 12 into the groove 46 of the capsule receiving table 4 below the magazine 3.

At the same time, the pusher 37 moves forward to lay the capsules 12, dropped into the grooves 46, into a lying state. The capsules 12 are pushed in the extending direction of the grooves 46 and transferred, while being kept in the lying state, into the grooves 48 of the adjacent weighing tables 5.

The capsules 12 whose weights are measured by the weighing tables 5 are discharged to the guide 7 by the discharge members 40.

In this apparatus, the grooves 46 and 48 communicating with each other are formed in the capsule receiving table 4 and the weighing tables 5. Therefore, when the pusher 37 lays the capsules 12, these capsules 12 fall such that their longitudinal direction is consistent with the extending direction of the grooves 46.

Accordingly, the capsules 12 falling in the extending direction of the grooves can be easily and reliably pushed to the weighing tables 5 by the pusher 37.

Also, while the pusher 37 is pushing the capsules 12, the shutter plate 52 of the shutter 51 positioned between the weighing tables 5 and the guide 7 has ascended to the position where the shutter plate 52 opposes the grooves 48 of the weighing tables 5.

Accordingly, even when the pusher 37 is moved fast to thrust away the capsules 12, the shutter plate 52 prevents the capsules 12 from springing out of the grooves 48 of the weighing tables 5 toward the guide 7.

Even when, therefore, the rotating speed of the driving motor 24 is raised to raise the moving velocity of the capsules 12 and thereby increase the measurement rate for the capsules 12 in the capsule weight measuring apparatus, the weight of each capsule 12 can be accurately measured.

For example, in a capsule weight measuring apparatus in which the capsules 12 are supplied through a total of sixteen supply paths 10 by juxtaposing two magazines 3 in each of which eight supply paths 10 are formed, the weights of a maximum of 1,250 capsules 12 can be measured per one minute.

Also, the pivoting position of the stopper locking members 32 is fixed, and the solenoids 35 as a stopper fixing mechanism for fixing the stoppers 30 to the lower end openings 31 are provided in a one-to-one correspondence with the supply paths 10 of the magazine 3.

Accordingly, the adjustment or maintenance inspection, for example, of the weighing machines can be executed while no capsules 12 are loaded onto the weighing tables 5 by stopping the supply of the capsules 12.

Additionally, since the solenoids 35 are provided in a one-to-one correspondence with the supply paths 10, it is possible to stop only the supply of the capsules 12 from the supply path 10 corresponding to the weighing table 5 of an abnormal weighing machine, while the other normal weighing machines are kept in operation.

Furthermore, as shown in FIGS. 8 to 10, as the upper air blow mechanism the communication hole 14 communicating with each supply path 10 is formed outside the magazine 3. Also, the nozzle 16 for applying pressurized air to each supply path 10 through the communication hole 14 when the magazine 3 reaches the upper end is fixedly disposed, normally in a non-contact state, in a position where the nozzle 16 opposes the communication hole 14.

When the upper end opening 13 of the supply path 10 clogs with the capsules 12, therefore, these capsules 12 in the upper end opening 13 can be scattered into the second hopper 2 by applying pressurized air from the nozzle 16 into the supply path 10.

For example, if a specific weighing table 5 does not output a measurement signal of the capsule 12 within a predetermined time even though a large number of the capsules 12 exist in the second hopper 2, it is determined that the upper end opening 13 clogs with the capsules 12. Accordingly, the nozzle 16 corresponding to the supply path 10 which corresponds to that weighing table 5 is automatically driven for a predetermined time. This automatically eliminates the clogging with the capsule 12.

The use of this upper air blow mechanism eliminates the need to always connect an air blow conduit directly to a vertically moving supply pipe as disclosed in U.S. Pat. No. 4,176,526. This simplifies the structure and handling of the piping for the nozzle 16.

Additionally, the nozzle 50 for applying pressurized air to the fine groove 47 formed in the bottom of each groove 46 of the capsule receiving table 4 and to the fine groove 49 formed in the bottom of the groove 48 of each weighing table 5 is provided in a position where the nozzle 50 opposes these fine grooves 47 and 49.

By applying pressurized air from this nozzle 50 to the fine grooves 47 and 49, therefore, it is possible to perform a cleaning operation by which dust deposited in the grooves 46 and 48 of the capsule receiving table and the weighing table 5 is blown off.

When this cleaning operation is performed at a predetermined period, for example, it is possible to always keep the weighing tables clean and maintain a high measurement accuracy.

In the selector 6, a determination controller (not shown) such as a CPU closes first and second gates 6a and 6b (FIG. 1) to a position A or B and a position C or D, respectively, on the basis of a measurement signal from each weighing table 5, thereby selectively supplying the measured capsule 12 to an OK passage, a −NG passage, or a +NG passage.

That is, in the selector 6, if the measurement signal from the weighing table 5 is within the tolerance, the CPU closes the first gate 6a to the position B to supply the measured capsule 12 to the OK passage.

If this is the case, the position of the second gate 6b can be left undetermined because the passage to the second gate 6b is closed.

In the selector 6, if the measurement signal from the weighing table 5 is smaller than the tolerance, the CPU closes the first gate 6a to the position A and the second gate 6b to the position C, thereby supplying the measured capsule 12 to the −NG passage.

In the selector 6, if the measurement signal from the weighing table 5 is larger than the tolerance, the CPU closes the first gate 6a to the position A and the second gate 6b to the position D, thereby supplying the measured capsule 12 to the +NG passage.

As has been described above, in the capsule weight measuring apparatus according to the present invention, the grooves as a first guide mechanism for receiving capsules falling from the supply paths formed in the magazine as a capsule supply mechanism are formed in the capsule receiving table. Also, the grooves as a second guide mechanism opposing and communicating with the grooves of the capsule receiving table are formed in the weighing tables. Accordingly, without uprightly dropping capsules onto weighing tables as in conventional techniques, capsules laid into a lying state by the pusher as a transfer mechanism are pushed from the grooves of the capsule receiving table by sliding the capsules along their longitudinal direction, and transferred to the grooves of the weighing tables.

In the capsule weight measuring apparatus of the present invention, therefore, capsules in a stable lying state are transferred onto the weighing tables. Accordingly, capsules are not dropped and transferred in an unstable upright state as in conventional techniques, and no vibrations are produced on the weighing tables. As a consequence, it is possible to rapidly measure the weight of each capsule while maintaining a high measurement accuracy.

Additionally, the capsule weight measuring apparatus of the present invention, the shutter which operates in synchronism with the magazine is disposed before the weighing tables. Therefore, even when capsules falling into the grooves of the capsule receiving table are rapidly pushed to the weighing tables, these capsules are prevented from springing out of the weighing tables. This further increases the rate at which the weight of each capsule is measured.

Also, in the capsule weight measuring apparatus of the present invention, the stopper fixing mechanism is incorporated to stop, where necessary, the supply of capsules from the supply paths of the magazine to the weighing tables. This improves the work efficiency of inspection and maintenance of the weighing tables.

Furthermore, in the capsule weight measuring apparatus of the present invention, the communication hole communicating with the outside is formed in each supply path of the magazine. The nozzle provided in a position where it opposes this communication hole when the magazine comes to the upper end position applies pressurized air to the supply path. Consequently, the clogging of the upper end opening of the supply path with capsules can be easily eliminated.

As described above, the use of this upper air blow mechanism eliminates the need to always connect an air blow conduit directly to a vertically moving supply pipe as in conventional techniques. This simplifies the structure and handling of the piping for the nozzle.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

I claim:

1. A capsule weight measuring apparatus comprising:
   a capsule supply unit for supplying a plurality of capsules one by one;
   a capsule receiving unit including a first guide portion having a shape by which one of the capsules supplied one by one from said capsule supply unit can be received in a lying state, rolling of the capsule can be inhibited, and the capsule can be discharged along a longitudinal direction thereof while being held in the lying state;
   a weighing unit including a second guide portion having a shape by which the capsule discharged from said first guide portion of said capsule receiving unit can be received while being held in the lying state, a weight of the capsule can be measured, and a measured capsule can be discharged;
   a transfer unit for pushing the capsule, received in the lying state by said first guide portion of said capsule receiving unit, to said second guide portion of said weighing unit while holding the capsule in the lying state; and
   a discharge unit for discharging the measured capsule from said second guide portion of said weighing unit.

2. An apparatus according to claim 1, wherein said capsule supply unit comprises:
   a magazine in which a supply path vertically extending through said magazine is formed so that an upper opening of said supply path communicates with a bottom of a hopper containing the capsules and the capsules are dropped in the longitudinal direction from a lower opening of said supply path to said capsule receiving unit, and which is so provided as to be periodically movable vertically;
   a driving unit for periodically moving said magazine vertically; and
   a stopper provided near a lower end of said supply path of said magazine to stop falling of the capsule from the lower end of said supply path when said magazine comes off a lower end position while being vertically driven by said driving unit.

3. An apparatus according to claim 1, wherein said first guide portion of said capsule receiving unit has a groove by which one of the capsules supplied one by one from said capsule supply unit can be received in the lying state, rolling of the capsule can be inhibited, and the capsule can be discharged along the longitudinal direction while being held in the lying state.

4. An apparatus according to claim 1, wherein said second guide portion of said weighing unit has a groove by which the capsule discharged from said first guide portion of said capsule receiving unit can be received while being held in the lying state, the weight of the capsule can be measured, and the measured capsule can be discharged.

5. An apparatus according to claim 2, wherein
   said first guide portion of said capsule receiving unit has a V-groove by which one of the capsules supplied one by one from said capsule supply unit can be received in the lying state, rolling of the capsule can be inhibited, and the capsule can be discharged along the longitudinal direction while being held in the lying state, and
   said second guide portion of said weighing unit has a V-groove by which the capsule discharged from said first guide portion of said capsule receiving unit can be received while being held in the lying state, the weight of the capsule can be measured, and the measured capsule can be discharged.

6. An apparatus according to claim 2, wherein said capsule supply unit further comprises a stopper fixing mechanism for maintaining said stopper in the capsule falling stop state.

7. An apparatus according to claim 5, wherein said transfer unit comprises a push transfer mechanism provided below said magazine to lay the capsule, falling from the lower end of said supply path to said first guide portion of said capsule receiving unit, along an extending direction of said V-groove, and push the capsule along the extending direction of said V-groove to said second guide portion of said weighing unit, in synchronism with a vertical motion of said magazine.

8. An apparatus according to claim 7, further comprising a shutter for preventing, in synchronism with said push transfer mechanism, when said magazine moves upward, the capsule pushed to said weighing unit by said push transfer mechanism from springing out of said weighing unit.

9. An apparatus according to claim 2, further comprising an upper air blow mechanism provided, normally in a non-contact state, in a position where, when said magazine is in an upper end position, said upper air blow mechanism opposes a communication hole formed near an upper end of said magazine and allowing said supply path to communicate with the outside, said upper air blow mechanism applying pressurized air into said supply path through said communication hole.

10. An apparatus according to claim 5, wherein in each of said first guide portion of said capsule receiving unit and said second guide portion of said weighing unit, a fine groove is formed in a bottom of said V-groove, and a lower air blow mechanism is further provided near the bottom of said V-groove to apply pressurized air to said fine groove.

11. An apparatus according to claim 1, wherein said discharge unit discharges the measured capsule from said second guide portion of said weighing unit in synchronism with said transfer unit.

* * * * *